United States Patent [19]
Maley et al.

[11] Patent Number: 5,915,107
[45] Date of Patent: Jun. 22, 1999

[54] CROSS CLOCK DOMAIN CLOCKING FOR A SYSTEM USING TWO CLOCK FREQUENCIES WHERE ONE FREQUENCY IS FRACTIONAL MULTIPLE OF THE OTHER

[75] Inventors: Reading G. Maley, San Francisco; Amos Ben-Meir, Cupertino; Anil Mehta, Milpitas, all of Calif.

[73] Assignee: Advanced Micro Devices, Inc., Sunnyvale, Calif.

[21] Appl. No.: 08/938,205

[22] Filed: Sep. 26, 1997

[51] Int. Cl.⁶ .................................. G06F 1/06; G06F 1/12
[52] U.S. Cl. ............................. 395/551; 395/556
[58] Field of Search ...................... 395/551, 556

[56] References Cited

U.S. PATENT DOCUMENTS

| | | | |
|---|---|---|---|
| 5,036,230 | 7/1991 | Bazes | 327/107 |
| 5,371,416 | 12/1994 | Atriss et al. | 327/145 |
| 5,450,458 | 9/1995 | Price et al. | 375/356 |
| 5,634,116 | 5/1997 | Singer | 395/551 |

*Primary Examiner*—Thomas M. Heckler
*Attorney, Agent, or Firm*—Skjerven, Morrill, MacPherson, Franklin & Friel LLP; David T. Millers

[57] ABSTRACT

A processor includes a processing core that is operable at a frequency that is an odd half-integer multiple of a bus clock frequency. Signals on a system bus are synchronized with a selected edge, e.g., the rising edge, of a bus clock signal, but the processing core requires signals synchronized with a processor clock signal. Signal crossing between the clock domain of the processing core and the clock domain of the system bus pass through a storage element that selectably latches a value of the signal either at a rising edge or a falling edge of the processor clock signal. A control circuit selects either rising-edge or falling-edge latching depending on which edge (rising or falling) is closest to being synchronized with the selected edge of the bus clock signal.

25 Claims, 8 Drawing Sheets

CROSS CLOCK DOMAIN CLOCKING FOR A SYSTEM USING TWO CLOCK FREQUENCIES WHERE ONE FREQUENCY IS FRACTIONAL MULTIPLE OF THE OTHER

BACKGROUND

1. Field of the Invention

This invention relates to circuits and methods for transferring signals across clock domains and particularly to input and output cells for a processor having a core that operates at a frequency that is a half-integer multiple of a bus clock frequency.

2. Description of Related Art

Microprocessors commonly employ a system bus that operates at a fixed clock frequency according to an established protocol and a processing core that operates at a higher frequency selected according to circuit performance. For example, a 66 MHz bus clock frequency is currently common for microprocessors that have processing cores operating at 133 MHz, 166 MHz, 200 MHz and 233 MHz. For such microprocessors, bus signals such as control, data, and address signals that are transmitted to or from the processor are synchronized with the bus clock. Conventionally, such bus signals become valid somewhat before an edge (conventionally a rising edge) of the bus clock signal and remain valid after the edge of the bus clock signal. The time between asserting a valid bus signal and the bus clock signal edge is referred to as the set-up time of the signal. The time during which the signal is valid after the edge of the bus clock signal is referred to as the hold time. The bus protocol defines required set-up and hold times for variety of types of bus signals.

In the processor, most bus signals must be resynchronized with a processor clock for the processing core. To resynchronize an input signal, a circuit element operated off the processor clock latches a signal from a circuit element operated off the bus clock. This is sometimes referred to as the signal crossing from the clock domain of the bus to the clock domain of the processing core. Similarly, a circuit element operated off the bus clock latches signals from the processing core to resynchronize the signals with the bus clock for output to the bus. Input/output (I/O) cells for a processor commonly synchronize signals crossing between a clock domain operating at the bus clock frequency and the clock domain of the processing core.

The processor clock is typically generated from the bus clock but is only approximately synchronized with the bus clock because frequency multipliers, phase locked loops, and other circuits that generate or distribute the processor clock signal are subject to skew. Such skew creates a range of possible time separations between edges of the bus clock signal and edges of the processor clock signal. The skew can be a problem when a bus protocol provides short set-up and hold times for bus signals because the time during which a signal is valid may not sufficiently overlap the time required for latching the signal when the signal crosses between time domains. Another concern when passing signals between the clock domains arises when the processor clock frequency is a non-integer multiple of the bus clock frequency. Bus signals are commonly synchronized with the rising edges of the bus clock signal, but when the processor clock frequency is a non-integer multiple of the bus clock frequency, the rising edge of the processor clock signal that is closest in time to a rising edge of the bus clock signal may be significantly offset. For example, if the processor clock frequency is an odd multiple of half of the bus clock frequency, half of the rising edges of the bus clock signal are approximately synchronized with falling edges of the processor clock signal and offset from a nearest rising edge of the processor clock signal by about half the period of the processor clock. Accordingly, a bus signal that is synchronized with a rising edge of the bus clock signal commonly does not have enough set-up or hold time for latching at the next rising edge of the processor clock signal.

Input/output cells for processors are sought that can accommodate a processor clock that has a frequency that is a non-integer multiple of the bus clock and is skewed relative to the bus clock.

SUMMARY

In accordance with an aspect of the invention, a circuit that passes signals between clock domains includes a storage element that selectably latches a signal on a rising edge or on a falling edge of a clock signal. A control circuit enables rising-edge or falling-edge latching depending on whether a rising edge or a falling edge of the clock signal is closest to being synchronized with a required edge of a lower-frequency clock signal. Accordingly, the offset between a triggering edge in the higher-frequency clock domain and the triggering edge in the lower-frequency clock domain is less, and the signal transmitted between the two domains can have a smaller set-up or hold time.

One embodiment of the invention is in a processor that includes a processing core operable at odd half-integer multiples of a bus clock frequency. Signals on a system bus for the processor are synchronized with a selected edge, e.g., the rising edge, of a bus clock signal. In contrast, the processing core requires signals valid at edges of a processor clock signal. Signals crossing between the clock domain of the processing core and the clock domain of the system bus enter a storage element that selectably has a valid output value either at a rising edge or a falling edge of the processor clock signal. A control circuit selects either rising-edge or falling-edge latching on the processor clock depending on which edge (rising or falling) is closest to being synchronized with the selected edge of the bus clock signal. In one embodiment of the invention, the storage element also latches at the selected edge of the bus clock signal if the selected edge of the bus clock signal precedes the rising or falling edge of the processor clock.

For input to the processing core, a signal synchronized with the selected edge of the bus clock signal is input to the storage element, and a signal output from the storage element is valid at an edge of the processor clock signal that is closest to being synchronized with the selected edge of the bus clock signal. For output from the processing core, the storage element latches the output signal in response to the rising or falling edge identified by the control circuit; and in response to the selected edge of the first clock signal, a second storage element latches the output signal from the first storage element.

Embodiments of the invention further include integrated circuit microprocessors and computer systems including microprocessors.

BRIEF DESCRIPTION OF THE DRAWINGS

FIG. 6 is a block diagram of a hybrid latch for use in the bi-directional input/output cell of FIG. 5.

Use of the same reference symbols in different figures indicates similar or identical items.

DETAILED DESCRIPTION OF THE PREFERRED EMBODIMENTS

In accordance with an aspect of the invention, a circuit that passes signals between clock domains includes a latch that selectably latches a signal on a rising edge or on a falling edge of a clock signal. A higher-frequency clock signal clocks the latch, and a control circuit enables rising-edge or falling-edge latching depending on whether a rising edge or a falling edge of the higher-frequency clock signal is closest in time to a required edge of a lower-frequency clock signal. Accordingly, the timing offset between the latching in the higher-frequency clock domain and the required edge of the lower-frequency clock signal is less, and the signal transmitted between the two domains can have a smaller set-up or hold time. The latch with selectable edge triggering is particularly useful in a processor where a processor clock signal has a frequency that is a half-integer multiple of the frequency of a bus clock signal. In this case, either the rising edge or the falling edge of the processor clock signal is approximately aligned with the rising edge of the bus clock signal.

Figure 1A:
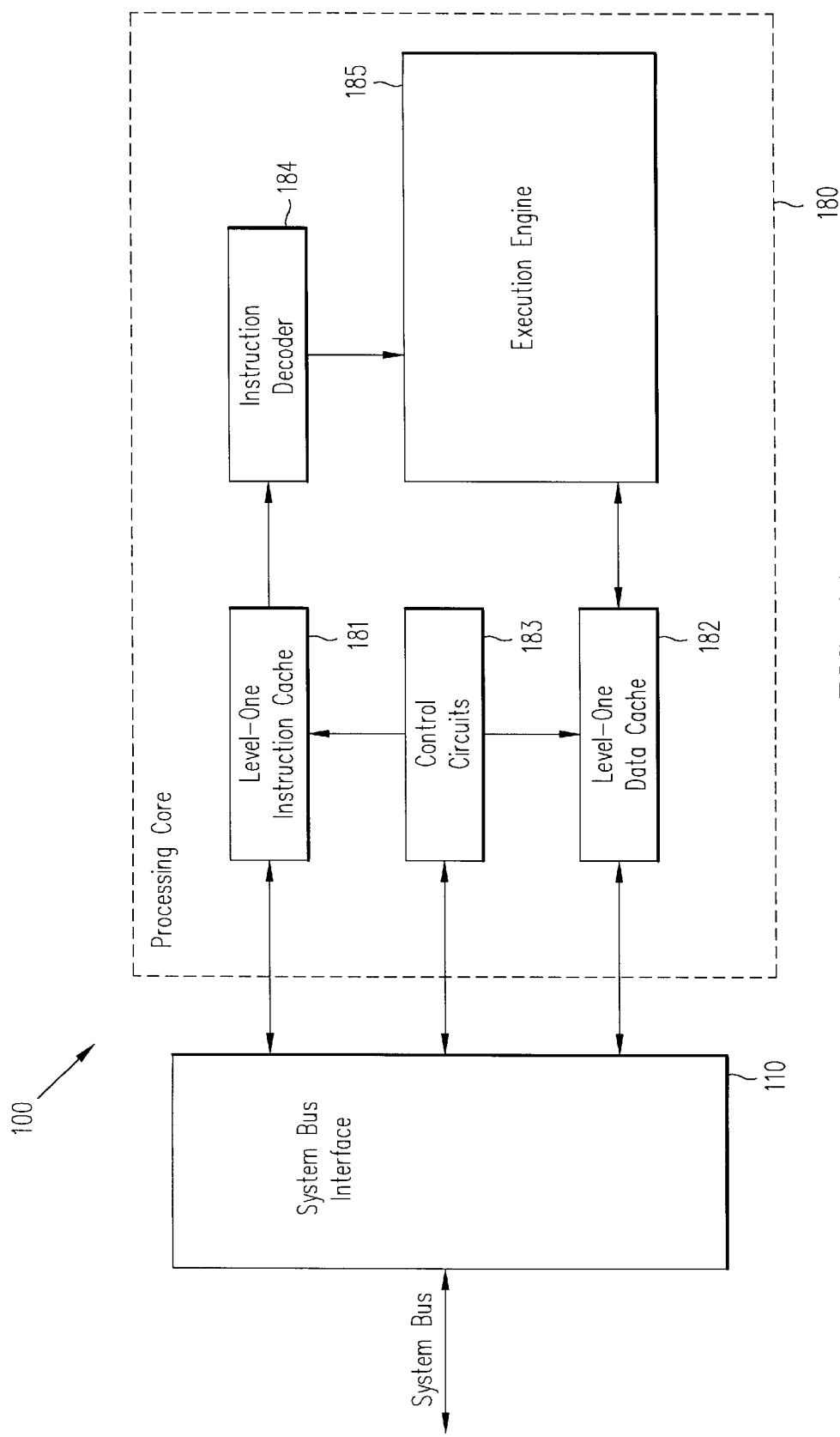
FIGS. 1A, 1B, 1C, and 1D are block diagrams of a processor containing input/output cells in accordance with an embodiment of the invention.

FIG. 1A shows a block diagram of a processor 100 that includes a system bus interface 110 that contains circuitry for controlling the timing of signals transferred between a clock domain for a system bus and a clock domain for a processing core 180. The architecture of processing core 180 is not critical to this invention. However, in the embodiment of FIG. 1A, processing core 180 includes: a level-one instruction cache 181, a level-one data cache 182, and a control circuit 183 that are coupled to system bus interface 110; an instruction decoder that decodes instructions from cache 181; and an execution engine 185 that executes the instructions. In an exemplary embodiment of the invention, processor 100 is a K6 processor available from Advanced Microdevices, Inc., and the system bus complies with a well known bus configuration commonly referred to as a socket 7 interface. Data, instructions, addresses, and control signals pass through system bus interface 110 between processing core 180 and the system bus.

A wide variety of computer system configurations are envisioned, each embodying a processor (e.g., processor 100) in accordance with the invention. For example, one such computer system includes an integrated circuit microprocessor with system bus interface 110 in accordance with the invention, a memory subsystem (e.g., RAM), a display adapter, disk controller/adapter, various input/output interfaces and adapters, and corresponding external devices. Memory, adapters and interfaces are conventionally coupled to integrated circuit microprocessor (e.g., via the system bus and system bus interface 110).

Figure 1B:
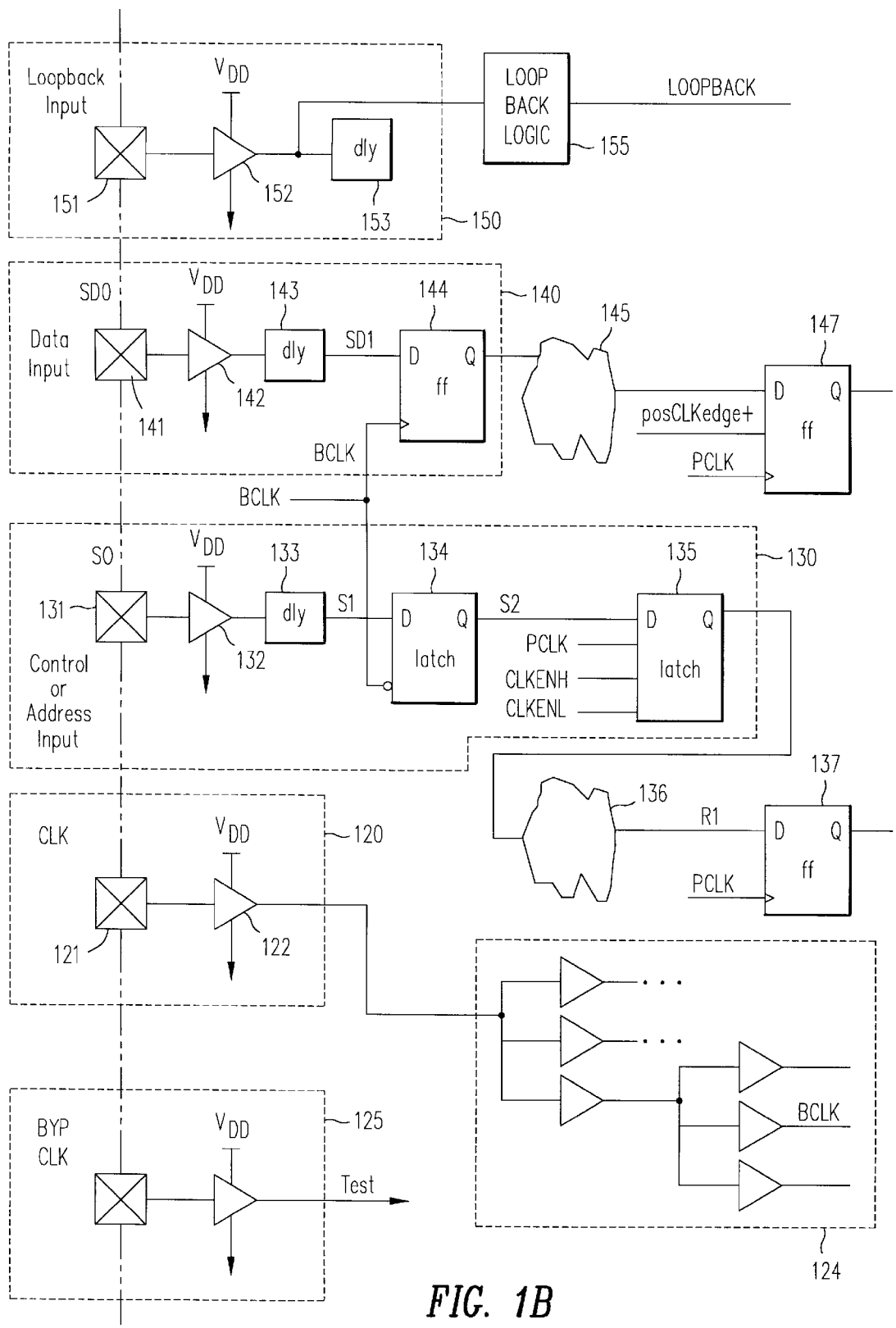
Figure 1C:
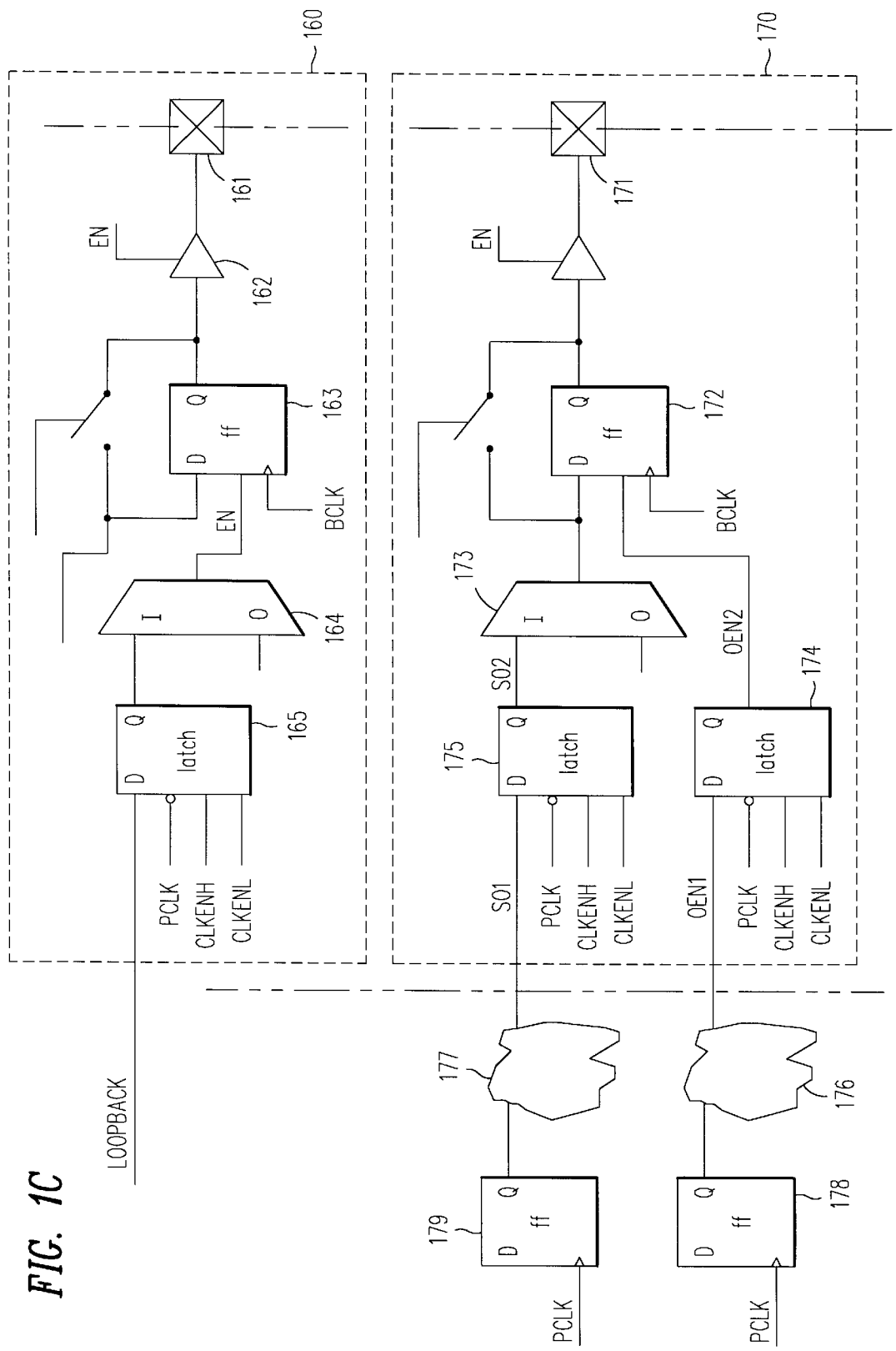

Accordingly, system bus interface 110 has several types of input and output cells including an input cell 120 for the bus clock signal, a cell 130 for input of an address or control signal, a cell 140 for input of a data signal, a cell 150 for input of loopback signals, a cell 160 for output of a signal under the control of a loopback signal, and an output cell 170 for a data signal from processing core 180. FIG. 1B shows input cells 120, 130, and 140. FIG. 1C shows Output cells 160 and 170.

A bus clock signal CLK on the system bus controls the timing of input signals to and output signals from processor 100. Input cell 120 receives clock signal CLK at a pad 121, and an input receiver 122 adjusts the voltage level of signal CLK as required for processor 100. Drivers 124 buffer signal CLK and distribute an internal bus signal BCLK throughout processor 100 including to a clock circuit 190, illustrated in FIG. 1D.

Clock circuit 190 generates a processor clock signal PCLK for processing core 180. Clock circuit 190 includes frequency dividers 193 and 194, a phase locked-loop (PLL) 195, and wave shaping circuits 196 and 197. Frequency divider 193 provides to PLL 190 a signal having half of the frequency $f_B$ of signal BCLK, and frequency divider 194 provides to PLL 195 a signal having a frequency equal to the frequency $f_P$ of signal PCLK divided by an integer N. In operation, PLL 195 compares to the signals from dividers 193 and 194 and maintains signal PCLK at a frequency $f_P$ that keeps the signals from dividers 193 and 194 in phase. Accordingly, the frequency $f_P$ of the processor clock signal PCLK is a half-integer (N/2) multiple of the frequency $f_B$ of bus clock signal BCLK. In the exemplary embodiment, integer N has a range from 4 to 11 and is selected according to testing that determines the maximum operable frequency for processor 100. Accordingly, frequency $f_P$ ranges between 2 and 5.5 times frequency $f_B$.

Wave shaping circuits 196 and 197 are respectively a level shifter and a flip-flop that together adjust the level of and sharpen the transitions in the signal from PLL 195. Clock circuit 190 also includes a multiplexer 198 for replacing the clock signal from PLL 195 with a signal BYPCLK input through an input cell 125 during debugging or testing. Otherwise the output signal from PLL 195 is routed through circuit elements 196, 197, and 198 to divider 194 and used elsewhere as a free running clock signal FRCLK. An AND gate 199 in clock circuit 190 stops processor clock signal PCLK from being distributed through processor 100 during a power-saving or sleep mode of operation, but during the sleep mode, PLL 195 maintains signal FRCLK and stays synchronized with signal BCLK.

Input cell 130, which is for an input address or control signal, includes a pad 131, an input receiver 132, input logic 133, a latch 134, and a special latch 135. Pad 131 receives an input signal for processor 100. Input receiver 132 adjusts the voltage level of the input signal for use in processor 100, and input logic 133 implements a programmable delay that can be used to optimize setup and hold times for the input signal. Circuit elements 132 and 133 introduce a delay between reception of the signal at pad 131 and reception of a signal S1 at latch 134. Latch 134 is transparent when bus clock signal BCLK is low and latches the value of the input signal at each rising edge of bus clock signal BCLK. Special latch 135 has an input terminal coupled to the output terminal of latch 134, a clock terminal for processor clock signal PCLK, and enable terminals for signals CLKENH and CLKENL. Special latch 135 is only transparent if signal CLKENH is asserted (high) and processor clock signal PCLK is high or signal CLKENL is asserted (high) and processor clock signal PCLK is low.

Figure 2:
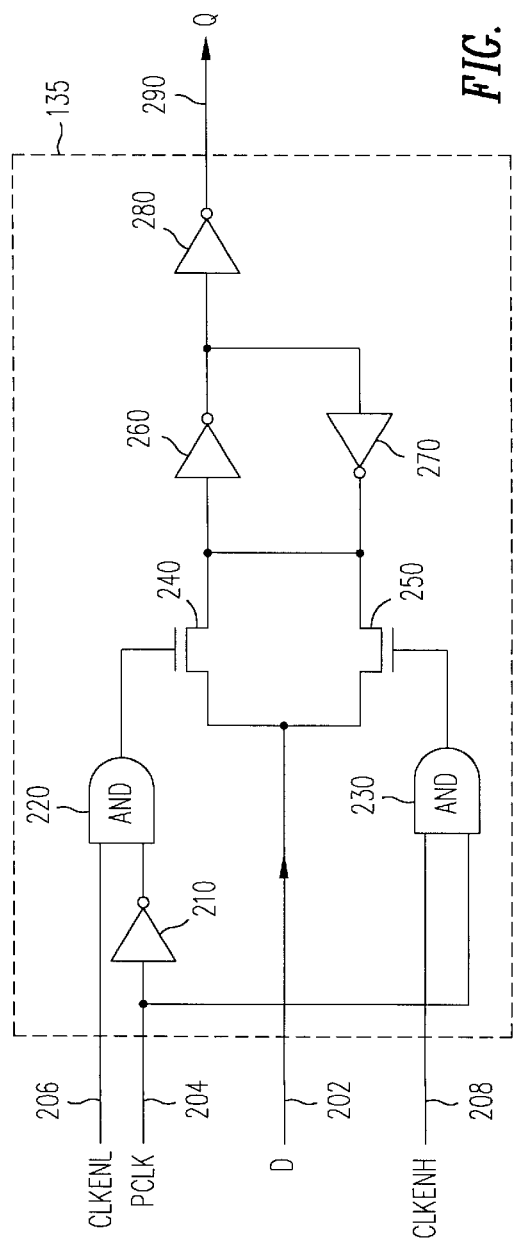
FIG. 2 is a functional diagram of a latch used in input/output cells of FIGS. 1B and 1C.

FIG. 2 shows a block diagram of an embodiment of special latch 135. Special latch 135 has a signal input terminal 202 which is connected though parallel transistors 240 and 250 to an input terminal of an inverter 260. When either of transistors 240 and 250 conducts, special latch 135 is transparent because series connected inverters 260 and 280 invert an input signal D from terminal 202 twice to generate an output signal Q that has the same binary level as signal D. If neither transistor 240 nor 250 conducts, special latch 135 is in the latched state, and a ring including inverters 260 and 270, each of which has an input terminal coupled to the output terminal of the other, keeps output signal Q constant. An inverter 210 and AND gates 220 and 230 control whether transistor 240 or 250 conducts. When signal CLKENL is asserted (high), AND gate 220 causes transistor 240 to conduct and latch 135 to be transparent when signal PCLK is low. Accordingly, when signal CLKENL is asserted, latch 135 latches signal D on a rising edge of signal PCLK. When signal CLKENH is asserted, AND gate 230 causes transistor 250 to conduct and latch 135 to be transparent when signal PCLK is high. Accordingly, when signal CLKENH is asserted, latch 135 latches signal D on a falling edge of signal PCLK. If neither of enable signals CLKENH and CLKENL is asserted, neither transistor 240 nor 250 conducts, and latch 135 is in a latched state with output signal Q being constant.

In accordance with an aspect of the invention, a control circuit (not shown) asserts signal CLKENL just before rising edges of signal PCLK that are approximately synchronized with rising edges of signal BCLK and asserts signal CLKENH just before falling edges of signal PCLK that are approximately synchronized with rising edges of signal BCLK. In configurations of processor 100 where the frequency $f_P$ of signal PCLK is an integer multiple of the frequency $f_B$ of signal BCLK, signal CLKENL is asserted with a frequency equal to frequency $f_B$, and signal CLKENH is always deasserted. In configurations of processor 100 where frequency $f_P$ is an odd multiple of half of frequency $f_B$, signals CLKENL and CLKENH are alternately asserted at rising edges of signal BCLK.

Figure 3:
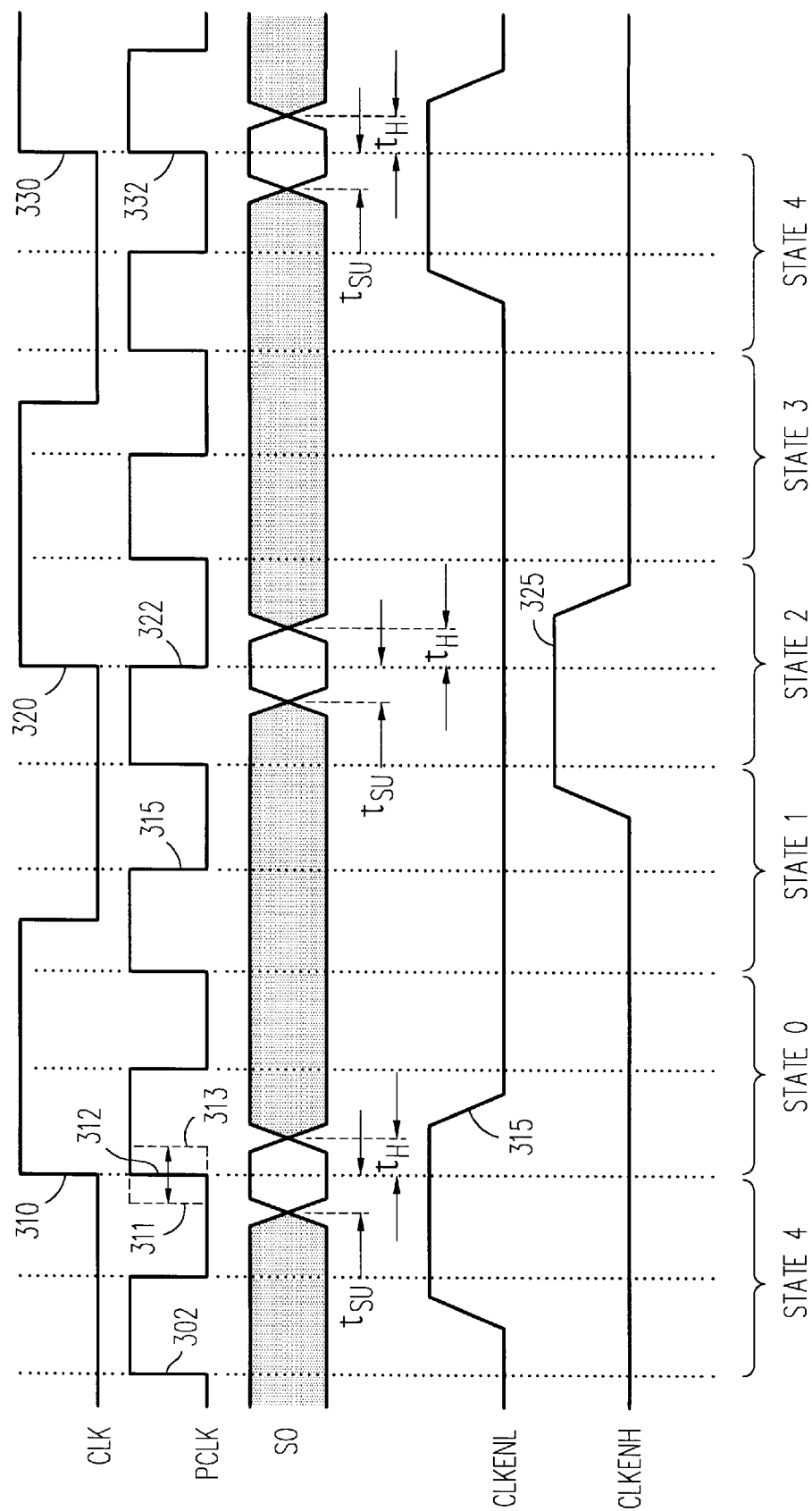
FIG. 3 shows timing diagrams for signals used with the latch of FIG. 2.

FIG. 3 shows timing diagrams for signals used in operation of special latch 135. According to the bus protocol for the exemplary embodiment of the invention, a signal S0 transmitted to processor 100 on the system bus is valid during a set-up time $t_{SU}$ before each rising edge of bus clock signal CLK at pad 121 and must remain valid during a hold time $t_H$ after the rising edge. Signal S1 to latch 134 inherits a duration from signal S0, but signal S1 is delayed relative to signal S0 at pad 131. Circuit blocks 132 and 133 are designed so the maximum delay from pad 131 to signal S1 matches the delay from bus clock signal CLK at pad 121 to bus clock signal BCLK from drivers 124. If this is the case, processor 100 introduces little or no additional setup or hold time requirement. For example, if the delay from signal CLK at pad 121 to signal BCLK from drivers 124 is much greater than the delay from signal S0 at pad 131 to signal S1 at latch 134, signal S1 must hold for at least the difference between the two delays, and processor 100 might require a hold time that is too large to meet the timing specification of the bus protocol. If the delay from pad 121 to signal BCLK is much less than the delay from pad 131 to latch 134, signal BCLK will be early to latch 134, and processor 100 might require a set up time that is greater than the bus protocol specifies.

Latch 135 latches a signal S2 at an edge (either a rising edge or a falling edge) of processor clock signal PCLK. For example, in FIG. 3, a rising edge 312 of signal PCLK corresponds to a rising edge 310 of signal BCLK. Ideally, edge 310 is precisely synchronized with edge 312. However, edge 312 is typically offset from edge 310 because of skew introduced in the generation and propagation of signal PCLK. Accordingly, edge 312 can occur at any point between times 311 and 313. If edge 312 of signal PCLK precedes edge 310 of signal BCLK, latch 135 latches the value of signal S2 while latch 134 operates in transparent mode. This value of signal S2 is valid if the sum of the total delay of signal S2 relative to signal BCLK and the time between edges 310 and 312 is less than setup time $t_{SU}$. Processor 100 must be meet this limitation. I/O cell 130 is for address and control signals which, for the exemplary embodiment, have a set-up time $t_{SU}$ that is relatively long, about 5 ns.

If edge 312 in signal PCLK follows edge 310 in signal BCLK, latch 134 latches signal S1 before latch 135 latches signal S2, and latch 134 keeps signal S2 at a valid level until latch 135 latches. Accordingly, latch 135 provides a valid signal level to logic 136 in processing core 180 beginning either at a rising or falling edge of clock signal PCLK.

As indicated above, when processor clock frequency $f_P$ is an odd multiple of half of bus clock frequency $f_B$, signals CLKENL and CLKENH are asserted at alternating rising edges of bus clock signal BCLK. FIG. 3 illustrates an example where processor clock frequency $f_P$ is 2.5 times bus clock frequency $f_B$. A pulse 315 in signal CLKENL is associated with rising edge 310 of signal BCLK and rising edge 312 of signal PCLK. The duration of pulse 315 is such that signal CLKENL remains asserted between times 311 and 312 so that latch 135 latches the value of signal S2 at rising edge 311. Pulse 315 is deasserted following rising edge 312 of signal PCLK, and latch 135 remains in the latched state until a pulse 325 in signal CLKENH. Thus, latch 135 provides a signal to processing core 180 that is valid for more than a single clock cycle of processor clock signal PCLK. Pulse 325 is associated with a rising edge 320 of signal BCLK and a falling edge 322 of signal PCLK. At falling edge 322, latch 135 latches the value of signal S2. Latch 135 then remains in the latched state until a pulse 335 in signal CLKENL. Signals CLKENH and CLKENL are alternately asserted in this fashion for following rising edges of bus clock signal BCLK.

Figure 4:
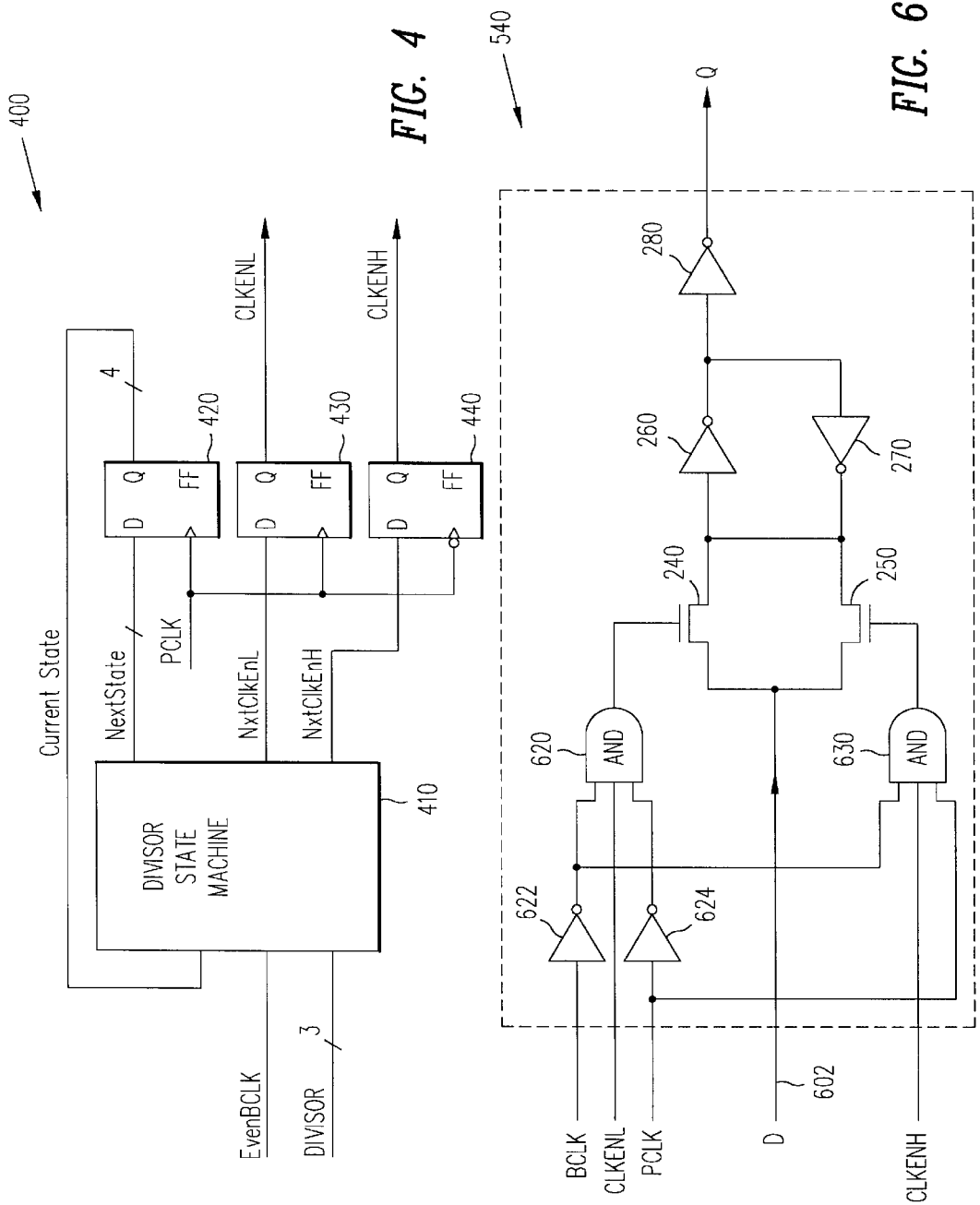
FIG. 4 is a block diagram of a circuit that generates control signals illustrated in FIG. 3.

FIG. 4 shows a block diagram of a circuit 400 that generates signals CLKENL and CLKENH in an exemplary embodiment of the invention. Circuit 400 is configurable for use in a system where processor clock frequency $f_P$ can be any of a set of half-integer multiples of bus clock frequency $f_B$. In the exemplary embodiment, for example, processor clock frequency $f_P$ is (N/2) times the bus clock frequency $f_B$, where N ranges from 4 to 11. Circuit 400 includes a state machine 410 having a range of states that depends on frequencies $f_B$ and $f_P$ or equivalently, on the number of cycles of processor clock signal PCLK per cycle of bus clock signal BCLK. Each possible range of states for state machine 410 includes an initial state 0 that state machine 410 enters at a rising edge of signal PCLK that is approximately synchronized with a rising edge of signal BCLK. State machine 410 enters state 0 when a signal EvenBCLK is asserted, which occurs at each rising edge of processor signal PCLK that is approximately synchronized with a rising edge of signal BCLK. Co-owned U.S. patent application Ser. No. 08/938,219, entitle "Even Bus Clock Circuit", attorney docket No. M-5142 U.S. describes a circuit suitable for generating signal EvenBCLK and is incorporated by reference in its entirety.

In cases where N is even, there are N/2 cycles of signal PCLK per cycle of signal BCLK, and each rising edge of bus clock signal BCLK is approximately synchronized with a rising edge of signal PCLK. State machine 410 has N/2 states ranging from state 0 to state (N/2)−1 and corresponding to the cycles of signal PCLK between consecutive rising edges signal BCLK. A signal CurrentState indicates the current state of state machine 419 and changes each cycle of processor clock signal PCLK as state machine 410 advances through the range of states. At each rising edge of processor clock PCLK, a flip-flop 420 changes signal CurrentState to the value of a signal NextState from state machine 410. In the last state (N/2)−1, state machine 410 asserts a signal NxtClkEnL to a flip-flop 430, and flip-flop 430 asserts signal CLKENL after the rising edge of signal PCLK that marks the beginning of state 0. State machine 410 deasserts signal NxtClkEnL during state 0 so that after the rising edge of signal PCLK, flip-flop 430 deasserts signal CLKENL. Signal CLKENH is not asserted for processor clock frequencies that are even half-integer multiples of the bus clock frequency.

In cases where N is odd, only half of rising edges of bus clock signal BCLK are approximately synchronized with a rising edge of signal PCLK. The other half of the rising edges are approximately synchronized with falling edges of signal PCLK. Accordingly, there are 2 cycles of signal BCLK or N cycles of signal PCLK between rising edges of signal BCLK that are synchronized with rising edges of signal PCLK. For odd N, state machine 410 has N states ranging from state 0 to state N−1 and corresponding to the cycles of signal PCLK between consecutive rising edges of signal BCLK that are synchronized with rising edges of signal PCLK.

FIG. 3 illustrates an example of the timing of signals CLKENL and CLKENH and the states of state machine 410, in the case where N is equal to five. In that example, state 0 begins at rising edge 312, and state 1 to state 4 are associated with consecutive cycles of signal PCLK ending at rising edge 332 which is associated with rising edge 330. In the last state 4, state machine 410 asserts signal NxtClkEnL to a flip-flop 430, and flip-flop 430 asserts signal CLKENL after a rising edge 302 of signal PCLK that marks the beginning of state 4. State machine 410 deasserts signal NxtClkEnL during state 0 so that after rising edge 312 of signal PCLK, flip-flop 430 deasserts signal CLKENL. Latch 135 latches the value of signal S2 at rising edge 312. In state 1 for N=5, i.e., the state preceding the processor clock cycle containing a falling edge approximately synchronized with a rising edge of signal BCLK, state machine 410 asserts a signal NxtClkEnH to a flip-flop 440. Flip-flop 440 is falling edge triggered and asserts signal CLKENH after a falling edge 315 of signal PCLK in the cycle during which signal NxtClkEnH is asserted. State machine 402 deasserts signal NxtClkEnL during the other states so that after falling edge 322 in the next cycle, e.g., state 2 in FIG. 3, flip-flop 430 deasserts signal CLKENH. Latch 135 latches the value of signal S2 at the same falling edge 322.

In FIG. 1B, latch 135 provides a valid value to processor core 180 beginning at an edge of processor clock signal PCLK and continuing for at least a cycle and a half of processor clock signal PCLK. Accordingly, when a rising edge triggers latch 135, logic 136 in processor core 180 can process the valid signal for a full processor clock cycle PCLK before a latch 137 latches a result R1 from logic 137 for a next stage of processing. If a falling edge of signal PCLK triggers latch 135, latch 137 is disabled from latching a value from logic 136 at the rising edge one half cycle after the falling edge that triggers latch 135. Logic 136 thus has a cycle and a half to process the valid signal from latch 135. Input cell 130 thus provides at least a full clock cycle of clock signal PCLK for processing of the input signal in core 180.

Input cell 140 is for a data bit and includes a pad 141, an input receiver 142, input logic 143, and a flip-flop 144. Pad 141, input receiver 142, and input logic 143 have functions similar or identical to the functions of pad 131, input receiver 132, and input logic 133, respectively, as described above. Rising edges of bus clock signal BCLK trigger flip-flop 144. For flip-flop 144 to latch valid data from a signal SD1, the delay of an input signal SD0 from pad 141 to flip-flop 144 must match the delay of clock signal CLK from pad 120 to bus clock signal BCLK at flip-flop 144 to within the tolerance provided by the set up and hold times of signal SD0. In contrast to cell 130, input cell 140 does not require that the set up time of signal SD0 accommodate any of the delay or skew between bus clock signal BCLK and processor clock signal PCLK. This is important because the bus protocol dictates that the set-up time be smaller for data signals than for the other signals. Since bus clock signal BCLK triggers flip-flop 144 and signal PCLK triggers a flip-flop 147 coupled to flip-flop 144 through logic 146 in processor core 180, skew of processing clock signal PCLK relative to bus clock signal BCLK can reduce the time that logic 146 has for processing before processor clock signal PCLK triggers flip-flop 147. Particularly, if signal PCLK is ahead of signal BCLK, logic 146 has less than a full processor clock cycle to process the signal from flip-flop 144 before flip-flop 147 latches the result for a next stage of processing in processor core 180. Logic 146 must be designed to complete the desired function in within a time less than a processor clock cycle by the maximum processor clock skew. Input cell 140 effectively moves the penalty due to possible phase misalignment of clock signals BCLK and PCLK from the signal SD0 at pad 141 to logic 146, which can more easily absorb the loss of time caused by phase misalignment of clock signals. If a falling edge of processor clock signal PCLK that is approximately aligned with a rising edge of bus clock signal BCLK, an enable signal posCLKedge+1 prevents flip-flop 147 from latching a new value at the immediately following rising edge of processor clock signal PCLK.

Input cells such as cell 140 handle signals that have relatively short set-up times and fast logic in a first processing stage in processor core 180. For data signals in the exemplary embodiment of the invention, the set-up time is 2.8 ns. Input cells such as cell 130 handle signals that have relatively longer set-up times and may require more processing in a first processing stage in processor core 180. For address and control signals in the exemplary embodiment of the invention, the set-up time is 5 ns.

In FIG. 1C, output cell 170 connects to two portions of logic 176 and 177 in processor core 180. Logic 176 generates a signal for output through output cell 170. Logic 177 generates an enable signal that determines whether output cell 170 can output the signal from logic 176. In output cell 170 are special latches 174 and 175 that are respectively coupled to logic 176 and 177, a flip-flop 172 which bus clock signal BCLK clocks, and a pad 171. In an output operation, logic 176 and 177 process signals from flip-flops 178 and 179, respectively. Flip-flops 178 and 179 provide valid signals at a rising edge of signal PCLK, and signals OEN1 and SO1 from logic 176 and 177 are valid by the next rising edge of processor clock signal PCLK. On the rising edges of signal PCLK that precede a rising edge of clock signal BCLK by about one half of a processor clock cycle, latches 178 and 179 are disabled from changing the signals provided to logic 176 and 178. Disabling latches 178 and 179 in this manner ensures that logic 176 and 177 have at least a full processor clock cycle before latches 174 and 175 require valid input signals.

Special latches 174 and 175 are the same as latch 135 as shown in FIG. 2 and are latched at an edge (rising or falling) of processor clock signal PCLK which corresponds to a rising edge of signal BCLK. If the edge of signal PCLK comes before the corresponding rising edge of signal BCLK, latches 174 and 175 latch valid values for signals OEN2 and SO2 and hold the values until after the rising edge of signal BCLK. If the rising edge of signal BCLK comes before the corresponding edge of signal PCLK, latches 174 and 175 are transparent and provide valid values for signals OEN2 and SO2 from logic 176 and 177. Signal OEN2 enables or disables operation of flip-flop 172. The data signal to flip-flop 172 is from a multiplexer 173 which alternatively selects a test signal or signal SO2 from latch 175. If enabled, flip-flop 172 generates a valid output signal at a rising edge of bus clock signal BCLK. According to the exemplary bus protocol, the valid output signal can have delay ranging from a minimum delay of 1 ns to a maximum delay 6 ns relative to bus clock signal CLK. Clocking flip-flop 172 with bus clock signal BCLK facilitates meeting of the required minimum and maximum delays.

As a general aspect that cells 130 and 170 have in common, a latch in the domain of the source of a signal controls set-up timing and a storage element in the domain receiving the signal controls the required hold time. For example, a signal crossing from the clock domain of the system bus to the clock domain of the processor core is first latched according to the internal bus clock signal BCLK, which is more easily controlled to be after the initial set-up of the input signal. Processor clock PCLK can trigger the storage element coupled to the latch during the set-up time while the latch is transparent or after the latch transitions to the latched state. Similarly, a signal crossing from the clock domain of the processor core to the clock domain of the system bus is first latched according to processor clock signal PCLK, which is easily control to be after the initial set-up in the processor core, and internal bus clock BCLK, which is most closely synchronized with the system bus, controls the storage element and the timing of the output signal.

Figure 1D:
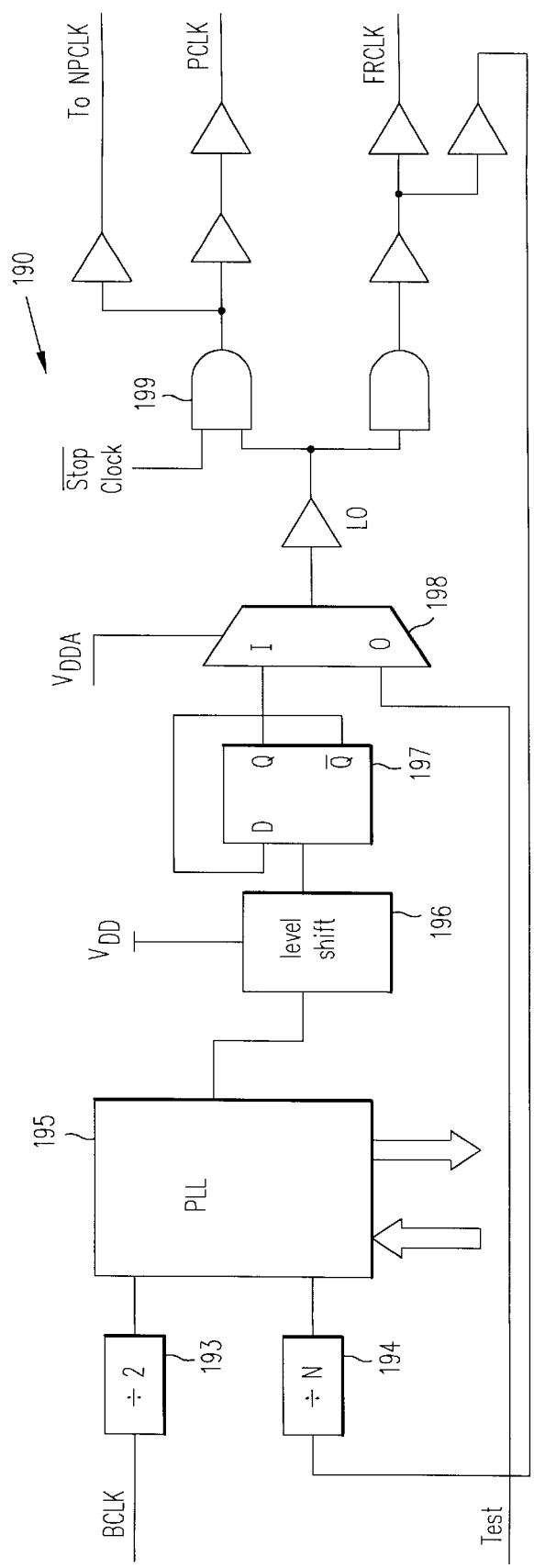

The exemplary bus protocol includes bus signals referred to as loop back signals. Loop back signals convey instructions that processor 100 must implement at the next rising edge of the bus clock signal. For example, a loop back signal may instruct processor 100 to immediately back off of or avoid driving an output signal to a particular set of pins during a commencing bus clock cycle. Input cell 150 (FIG. 1B) is for input of loop back signals and includes a pad 151, an input receiver 152, and input logic 153. Loop back logic 155 receives and processes the loop back signal without any intervening latches or flip-flops. Loop back logic 155 provides a result signal LOOPBACK to the circuits affected, for example, to an output cell 160 (FIG. 1D). Loop back logic 155 enables or disables output from output cell 160 depending on the input signal to input cell 150. Output cell 160 contains a special latch 165, which is the same as special latch 135 of input cell 130, and a flip-flop 163, which bus clock signal BCLK clocks. Latch 165 latches the signal from loop back logic 155 at a rising or falling edge of signal PCLK which corresponds to a rising edge of signal BCLK. At the rising edge of signal BCLK, latch 165 provides a valid enable signal to flip-flop 163 through multiplexer 164. The enable signal is the latched value in latch 165 if the edge of signal BCLK follows the associated edge of signal PCLK or is the current signal value from loop back logic 155 if latch 165 is in transparent mode at the rising edge of signal BCLK. If the signal from latch 165 enables flip-flop 163, flip-flop 163 latches a new value for an output signal from cell 160 at a rising edge of signal BCLK. The output signal is output through pad 161 if a buffer 162 is enabled.

Figure 5:
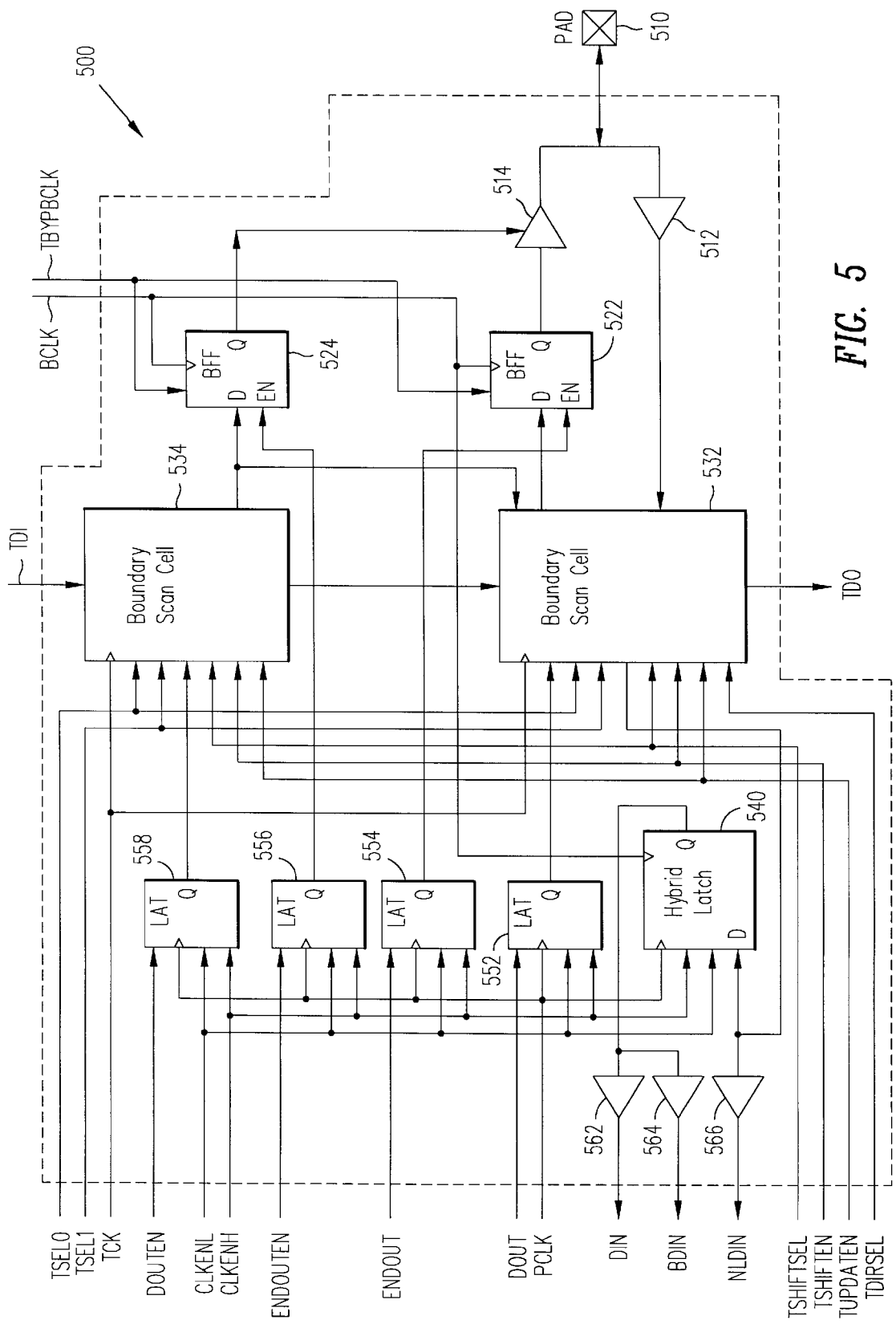
FIG. 5 shows a bi-directional input/output cell in accordance with an embodiment of the invention.

FIG. 5 shows a functional diagram of a bi-directional input/output (I/O) cell 500 in accordance with an embodiment of the invention. Bi-directional I/O cell 500 is for signals crossing between a clock domain operated according to clock signal BCLK and a clock domain operated according to clock signal PCLK. In the exemplary embodiment of the invention, the clock domains are in a microprocessor, and clock signals BCLK and PCLK are respectively bus and processor clock signals. However, I/O cell 500 and the clocking techniques described are not limited to use in processors but can also be used in other circuits requiring signals that cross clock domains. I/O cell 500 has an input signal path including a pad 510, an input receiver 512, a boundary scan cell 532, a hybrid latch 540, and input buffers 562, 564, and 566. When pad 510 receives an input signal, input receiver 512 converts the level of the input signal to a corresponding level for use in cell 500 and an integrated circuit including cell 500. Input receiver 512 sends the signal to boundary scan cell 532 which with a boundary scan cell 534 implements JTAG testability. During normal input, the signal from input receiver 512 flows through boundary scan cell 532 to an input terminal of hybrid latch 540 and to buffer 566. Hybrid latch 540 latches input signal for use in a clock domain operated according to clock signal PCLK. Buffers 562 and 564 provide latched signals DIN and DBIN that differ in drive strength and delay. Buffer 566 generates an unlatched signal NLDIN usable for loop back signals in the exemplary bus protocol.

FIG. 6 shows a functional diagram of hybrid latch 540 which contains transistors 240 and 250 and inverters 260, 270, and 280 that operate substantially as described above in regard to special latch 135 of FIG. 2. Like latch 135, hybrid latch 540 uses signals CLKENL and CLKENH to select whether a rising or falling edge of signal PCLK causes latching, but latch 540 differs from latch 135 in that both clock signals BCLK and PCLK control latching. When signal CLKENL is asserted, latch 540 is transparent if both clock signals BCLK and PCLK are low, and whichever of clock signals BCLK and PCLK has the first rising edge causes latch 540 to latch a signal D from an input terminal 602. To implement this function, an AND gate 620 turns on transistor 240 and allows signal D to set the input voltage to inverter 260 when signals CLKENL, BCLK, and PCLK are respectively high, low, and low. When signal CLKENH is asserted, latch 540 is transparent when clock signal BCLK is low and signal PCLK is high, and a rising edge of signal BCLK or a falling edge of signal PCLK, whichever occurs first, causes latch 540 to latch the signal from input terminal 602. When signals CLKENH, BCLK, and PCLK are respectively high, low, and high, an AND gate 630 turns on transistor 250 and allows signal D to set the input voltage to inverter 260.

Figure 7:
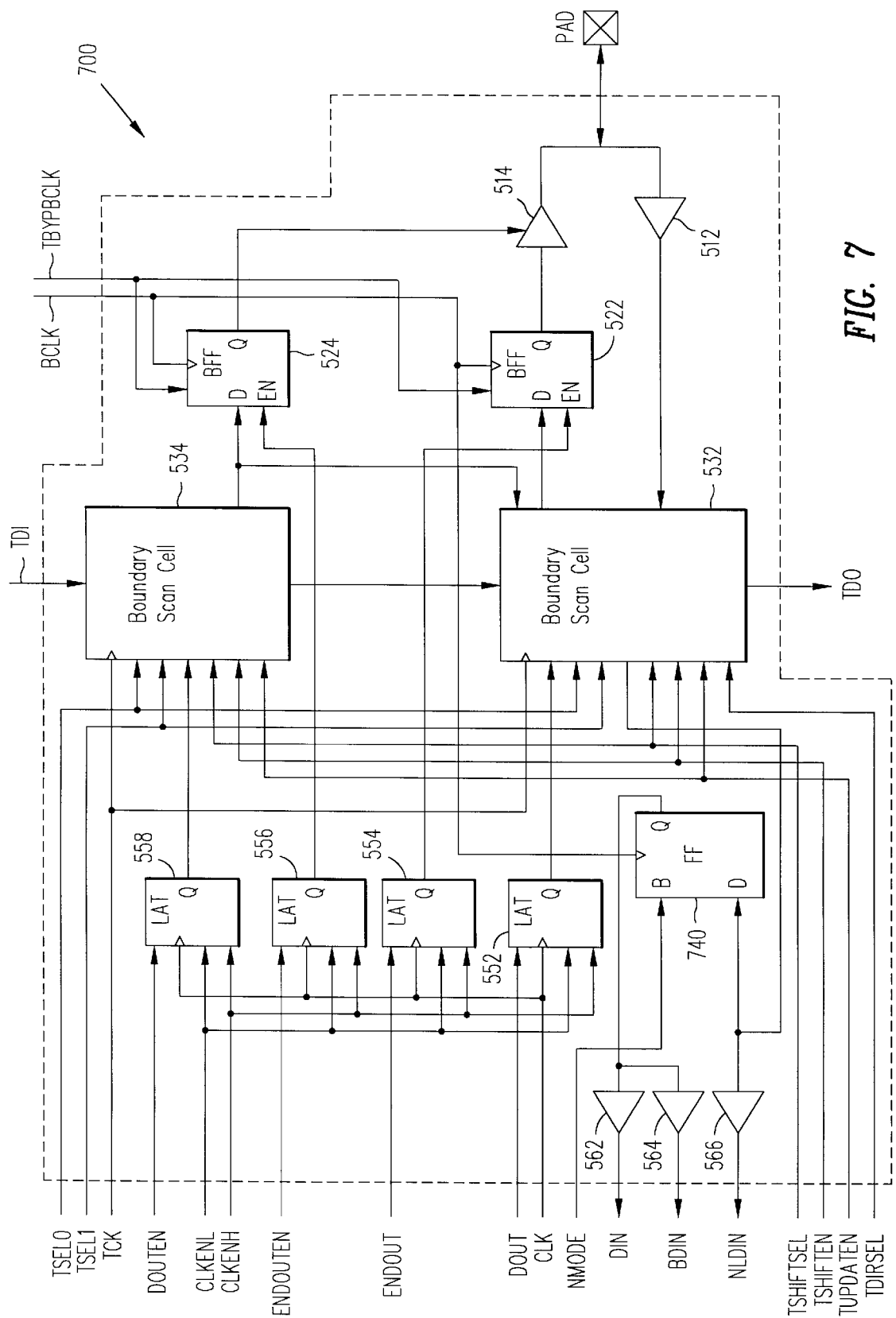
FIG. 7 shows a bidirectional input/output cell in accordance with another embodiment of the invention.

In FIG. 5, since latch 540 latches at the earlier of an edge of signal PCLK and a rising edge of signal BCLK, latch 540 provides a valid latched value at or before the edge of signal PCLK that corresponds to a rising edge of signal BCLK. Accordingly, a circuit receiving an input signal DIN or BDIN has at least a full cycle of signal PCLK before the next similar edge of signal PCLK. However, the input signal to latch 540 must have a set-up time which accommodates delay in reaching latch 540 and the early clocking by either signal BCLK or signal PCLK. FIG. 7 shows an I/O cell 700 having a flip-flop 740 that replaces hybrid latch 540 of FIG. 5. Signal BCLK clocks flip-flop 740 which reduces the limitations on the set-up time of the input signal. I/O cell 700 otherwise contains elements that are the same as those in I/O cell 500 and are described in regard to FIG. 5.

An output signal data path in I/O cell 500 includes a special latch 552, boundary scan cell 532, a flip-flop 522, an output driver 514, and pad 510. Special latch 552 is the same as latch 135 of FIG. 2 and latches an output signal from the clock domain of clock signal PCLK at a rising or falling edge of signal PCLK depending on which edge is approximately synchronized with a rising edge of signal BCLK. During normal operation, the latched output signal from latch 552 passes through boundary scan cell 532 to flip-flop 522 that has enable and pass-through circuitry. For testing, the pass-through circuit (e.g., a transistor with a gate coupled to a signal TBYPBCLK) allows an input signal to pass directly through flip-flop 522. For normal operation, a special latch 554, which is also the same as latch 135 of FIG. 2, latches an input signal ENDOUT that enables flip-flop 522, and when enabled, signal BCLK clocks flip-flop 522. Accordingly, an output signal from flip-flop 522 is synchronized with signal BCLK.

A tristate buffer 514 has an input coupled to flip-flop 522. An enable signal DOUTEN, which turns tristate buffer 514 on and off, passes through a special latch 558, boundary scan cell 534, and a flip-flop 524. Special latch 558 is the same as latch 135. Flip-flop 524 is the same as flip-flop 522 and includes an enable and a pass-through circuit. An input signal ENDOUTEN, which a special latch 556 receives, enables operation of flip-flop 524 so that the state of tristate buffer 514 can be changed. When enabled, flip-flop 524 latches the value of signal DOUTEN from special latch 558 at a rising edge of signal BCLK. Storing of a new value in flip-flop 524 can turn on buffer 514 for output to pad 510 or turn off buffer 514 for input from pad 510. When flip-flop 524 is disabled, the state of buffer 514 remains constant regardless of changes in signal ENDOUTEN.

Although the invention has been described with reference to particular embodiments, the description is only an example of the invention's application and should not be taken as a limitation. For example, although FIGS. 5 and 7 illustrate bi-directional I/O cells 500 and 700, cell 500 or 700 can be an input cell or an output cell either by not using the output signal path or the input signal path or by removing the unused signal path. Various other adaptations and combinations of features of the embodiments disclosed are within the scope of the invention as defined by the following claims.

We claim:

1. An integrated circuit comprising:
   a first circuit that is clocked by a first clock signal having a first frequency;
   a second circuit that is clocked by a second clock signal, the second clock signal having a second frequency that is a non-integer multiple of the first frequency;
   control logic that during each cycle of the first clock signal, generates a control signal indicating whether a rising edge or a falling edge of the second clock signal is closest to being synchronized with a selected edge of the first clock signal; and
   a first storage element coupled between the first circuit and the second circuit, a control terminal of the first storage element being coupled to the control logic, wherein the first storage element latches a value in response to a rising edge of the second clock signal if the control signal indicates the rising edge is closest to being synchronized with the selected edge of the first clock signal and latches a value in response to a falling edge of the second clock signal if the control signal indicates the falling edge is closest to being synchronized with the selected edge of the first clock signal.

2. The circuit of claim 1, wherein:
   the second frequency is an odd integer multiple of half of the first frequency; and
   the control signal alternates between indicating a rising edge of the second clock signal is closest to being synchronized with the selected edge of the first clock signal and indicating a falling edge of the second clock signal is closest to being synchronized with the selected edge of the first clock signal.

3. The circuit of claim 1, wherein the first circuit comprises a second storage element having an output terminal coupled to an input terminal of the first storage element, wherein the second storage element latches an input signal at the selected edge of the first clock signal.

4. The circuit of claim 3, wherein each of the first and second storage elements comprises a latch.

5. The circuit of claim 1, further comprising:
   a second storage element having an input terminal coupled to the second circuit and a control terminal coupled to the control logic, wherein the second storage element latches a value from the input terminal at a rising edge of the second clock signal if the control signal indicates the rising edge is closest to being synchronized with the selected edge of the first clock signal and latches a value from the input terminal at a falling edge of the second clock signal if the control signal indicates the falling edge is closest to being synchronized with the selected edge of the first clock signal; and
   a third storage element having an input terminal coupled to an output terminal of the second storage element, wherein the second storage element latches a value from the second storage element at the selected edge of the first clock signal.

6. The circuit of claim 1, wherein the first storage element comprises a latch.

7. The circuit of claim 1, wherein the integrated circuit is a processor and the second circuit comprises a processing core.

8. An integrated circuit comprising:
   a first circuit that is clocked by a first clock signal having a first frequency;
   a second circuit that is clocked by a second clock signal, the second clock signal having a second frequency that is a non-integer multiple of the first frequency;
   control logic that during each cycle of the first clock signal, generates a control signal indicating whether a rising edge or a falling edge of the second clock signal is closest to being synchronized with a selected edge of the first clock signal; and
   a latch coupled between the first circuit and the second circuit, a control terminal of a first storage element being coupled to the control logic, wherein the latch transitions from a transparent state to a latched state in response to a rising edge of the second clock signal if the control signal indicates the rising edge is closest to being synchronized with the selected edge of the first clock signal and transitions from the transparent state to the latched state in response to a falling edge of the second clock signal if the control signal indicates the falling edge is closest to being synchronized with the selected edge of the first clock signal.

9. The integrated circuit of claim 8, wherein the latch also transitions from the transparent state to the latched state in response the selected edge of the first clock signal.

10. The circuit of claim 9, wherein:
the second frequency is an odd integer multiple of half of the first frequency; and
the control signal alternates between indicating a rising edge of the second clock signal is closest to being synchronized with the selected edge of the first clock signal and indicating a falling edge of the second clock signal is closest to being synchronized with the selected edge of the first clock signal.

11. The circuit of claim 9, wherein the latch has an input terminal coupled to the first circuit and an output terminal coupled to the second circuit.

12. The circuit of claim 8, wherein the control signal comprises a first binary signal that is asserted to indicate a rising edge is closest to being synchronized with the selected edge of the first clock signal and a second binary signal that is asserted to indicate a falling edge is closest to being synchronized with the selected edge of the first clock signal.

13. A processor comprising:
bus interface circuitry that is clocked at a first frequency by a first clock signal;
a processor core that is clocked by a second clock signal, the second clock signal having a second frequency that is a non-integer multiple of the first frequency;
control logic that during each cycle of the first clock signal, generates a control signal indicating whether a rising edge or a falling edge of the second clock signal is closest to being synchronized with a selected edge of the first clock signal; and
a first latch coupled between the bus interface circuitry and the processor core, a control terminal of the latch element being coupled to the control logic, wherein the first latch transitions from a transparent state to a latched state in response to a rising edge of the second clock signal if the control signal indicates the rising edge is closest to being synchronized with the selected edge of the first clock signal and transitions from the transparent state to the latched state in response a falling edge of the second clock signal if the control signal indicates the falling edge is closest to being synchronized with the selected edge of the first clock signal.

14. The processor of claim 13, wherein the first latch also transitions from the transparent state to the latched state in response the selected edge of the first clock signal.

15. The processor of claim 13, further comprising a second latch having an input terminal coupled to an output terminal of the first latch, wherein the second latch transitions from a transparent state to a latched state at the selected edge of the first clock signal.

16. The processor of claim 13, further comprising a flip-flop having an input terminal coupled to an output terminal of the first latch, wherein the flip-flop latches a value from the input terminal at the selected edge of the first clock signal.

17. A computer system comprising a processor, said processor comprising:
bus interface circuitry that is clocked at a first frequency by a first clock signal;
a processor core that is clocked by a second clock signal, the second clock signal having a second frequency that is a non-integer multiple of the first frequency;
control logic that, during each cycle of the first clock signal, generates a control signal indicating whether a rising edge or a falling edge of the second clock signal is closest to being synchronized with a selected edge of the first clock signal; and
a first latch coupled between the bus interface circuitry and the processor core, a control terminal of the latch element being coupled to the control logic, wherein the first latch transitions from a transparent state to a latched state in response to a rising edge of the second clock signal if the control signal indicates the rising edge is closest to being synchronized with the selected edge of the first clock signal and transitions from the transparent state to the latched state in response to a falling edge of the second clock signal if the control signal indicates the falling edge is closest to being synchronized with the selected edge of the first clock signal.

18. The computer system of claim 17, further comprising a system bus and a memory coupled to the bus interface circuitry via the system bus.

19. A method for transferring signals between clock domains, comprising:
applying a first signal to an input terminal of a storage element, wherein the first signal is to be transferred between a first clock domain operated according to a first clock signal having a first frequency and a second clock domain operated according to a second clock signal having a second frequency;
generating a second signal that indicates whether a rising edge or a falling edge of the second clock signal is closest to being synchronized with a selected edge of the first clock signal; and
applying the second signal to the storage element to select whether the storage element latches a value of the first signal on a rising edge or a falling edge of the second clock signal.

20. The method of claim 19, wherein the first signal is synchronized with the selected edge of the first clock signal and generated in the first clock domain, and an output signal from the storage element is synchronized with the second clock signal for the second clock domain.

21. The method of claim 19, further comprising applying an output signal from the storage element to a second storage element that latches a value of the output signal at the selected edge of the first clock signal.

22. The method of claim 21, wherein the first signal is synchronized with the second clock signal and generated in the second clock domain, and a second output signal, which is from the storage element, is synchronized with the first clock signal for the first clock domain.

23. The method of claim 19, wherein the second frequency is an odd integer multiple of half of the first frequency.

24. The method of claim 19, wherein the first storage element is a latch.

25. The method of claim 24, wherein the storage element latching a value of the first signal comprises the storage element transitioning from a transparent state to a latched state in response to whichever occurs first of the selected edge of the first clock signal and the edge of the second clock signal selected by the second signal.

* * * * *